Dec. 21, 1926.
W. R. MITTENDORF
1,611,481
COUNTING SCALE
Filed August 31, 1923   2 Sheets-Sheet 2
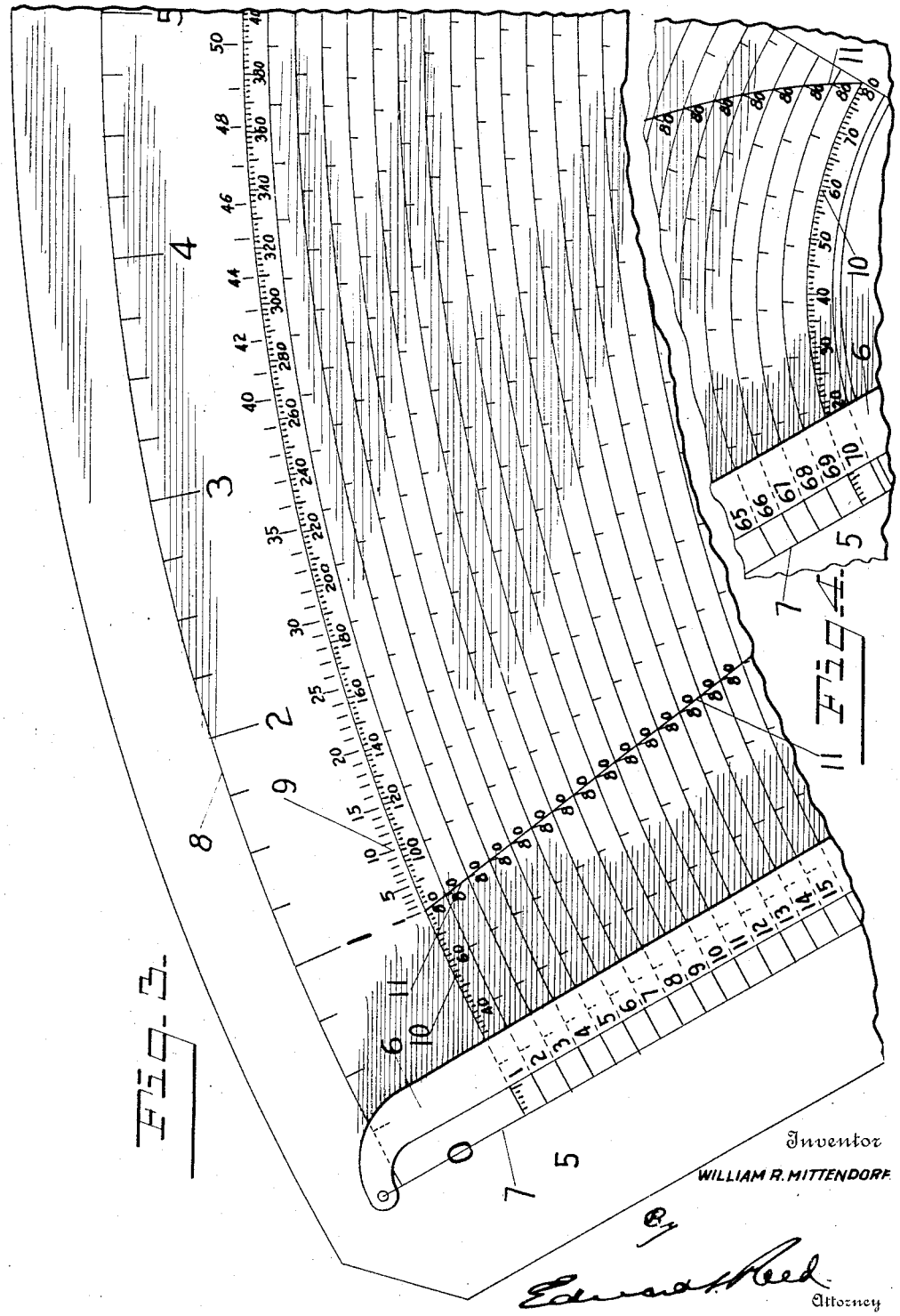
Inventor
WILLIAM R. MITTENDORF Patented Dec. 21, 1926.

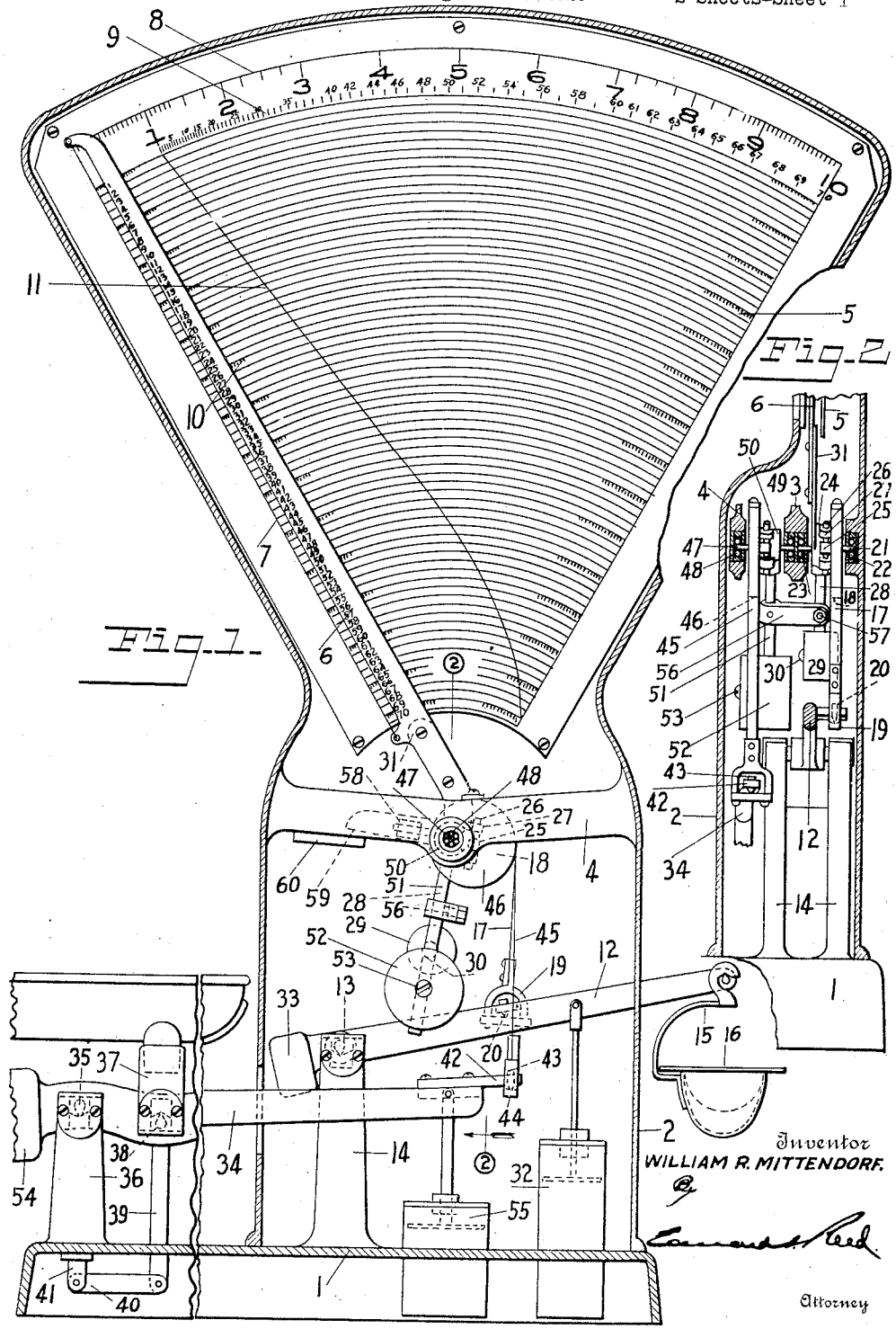

1,611,481

UNITED STATES PATENT OFFICE.

WILLIAM R. MITTENDORF, OF CINCINNATI, OHIO, ASSIGNOR, BY MESNE ASSIGNMENTS, TO THE WATSON EXPERIMENTAL LABORATORY COMPANY, OF DAYTON, OHIO, A CORPORATION OF OHIO.

COUNTING SCALE.

Application filed August 31, 1923. Serial No. 660,298.

This invention relates to computing scales and more particularly to a counting scale of that type in which a code number or index number is utilized as a basis for computation.

One object of the invention is to provide such a scale which will be fully automatic in its action and will require no mechanical manipulation on the part of the operator, thereby avoiding mistakes and saving both time and labor.

A further object of the invention is to provide such a scale which will automatically establish an index number corresponding to the weight of a unit of the parts to be counted and will then automatically indicate the number of such units which may comprise the load on the load platform of the scale.

A further object of the invention is to provide such a counting scale which will calculate any number of parts in a lot of unknown quantity within the capacity of the scale, and which may also be used to make up lots of parts of any predetermined quantity within the capacity of the scale.

A further object of the invention is to provide such a scale which will count parts of any odd unit of weight within its capacity without in any manner changing the mechanical multiplication of leverage which exists in the scale.

A further object of the invention is to provide an automatic counting scale of this type which will have a relatively small number of index numbers and in which the index numbers serve to establish a reading line on the chart corresponding to the unit weight of the parts to be counted, and in which all graduations and numerals representing quantity are carried by the chart, the indicator carrying only the index numbers.

A further object of the invention is to provide an automatic counting scale which will indicate the number of parts in the lot and the weight of the lot simultaneously.

A further object of the invention is to provide an automatic counting scale which will be simple in its construction, accurate in its operation and in which any error due to a plus or minus variation of the index number will be easily within the range of ordinary commercial practice.

Other objects of the invention will appear as the apparatus is described in detail.

In the accompanying drawings Fig. 1 is a sectional view, partly broken away, of a scale embodying my invention, showing the operative parts in elevation; Fig. 2 is a section taken on the line 2—2 of Fig. 1;

Fig. 3 is a fragmental view of an upper portion of the chart showing the same on a larger scale; and Fig. 4 is a similar view of the lower portion of the chart.

In these drawings I have illustrated one embodiment of my invention and have, for the purposes of illustration, shown the same as embodied in a pendulum operated scale having a stationary fan shaped chart and a movable indicator arm. It will be understood, however, that the invention may be applied to scales of various kinds and that the indicating or calculating members may take various forms and that either of said members may be actuated. Further, it will be understood that the means for actuating the movable indicating member to establish the index number and to effect the computation may take various forms.

In that particular embodiment of the invention here shown the scale as a whole comprises a main frame consisting of a base 1 having mounted thereon an upwardly extending housing 2 having transverse bars 3 and 4. Rigidly secured to this frame and, in the present instance, inclosed in the upper portion of the housing is a chart 5. Cooperating with this chart is a movable indicator in the form of an elongated arm 6 pivotally mounted at its lower end on the axis of the chart and comprising a reading line or wire 7 extending lengthwise thereof. The chart is provided with three separate sets of graduations, the several graduations of each set being numbered. The first and uppermost set of graduations on the chart, as shown at 8, are weight graduations and are divided into pounds and ounces, the graduations running from zero to ten pounds, which is the capacity of the present scale. The second set of graduations which are arranged immediately below the weight graduations, as shown at 9, comprises a single series of graduations representing index numbers. These index number graduations extend, in the present instance, from one to seventy inclusive and are preferably printed on the chart in a different color from the other indications so as to be readily distinguishable therefrom. The third set of graduations, which occupies the body of the chart, consists of a plurality of series of graduations, as shown at 10, these graduations representing numbers of units and being utilized to determine and indicate the number of units in any load placed upon the scale.

The movable indicator arm 6 is provided with longitudinally extending series of index numbers corresponding to the several index number graduations 9 and arranged adjacent to the respective unit number graduations 10 on the body of the chart, there being in the present instance, seventy series of unit number graduations. To select or determine the index number to be used in effecting a computation, or count, the movable member of the counting or indicating device is automatically actuated by means controlled by a unit of the articles to be counted to cause the indicator wire 7 to intersect the series of index number graduations 9 at a point corresponding to the weight of the unit. The index number on the indicator arm which corresponds to the index number so selected determines the reading line or series of unit number graduations on the chart upon which the computation is to be made. To effect a computation, or count, the movable member of the computing device is also actuated by means controlled by the load, consisting of the mass of articles to be counted, and is thus moved over the chart a distance corresponding to the weight of the mass, and that graduation, of the series of graduations corresponding to the index number, which is intersected by the indicator wire will represent the number of units in the mass of articles on the scale.

Other means may be provided for determining the index number. In the present apparatus I have included two means for determining this number either of which may be used at the option or convenience of the operator. The second means for determining the index number consists of a spiral line 11 intersecting the several series of unit number graduations and so arranged that the index number on the indicator which is adjacent to the point at which the indicator intersects the spiral line 11 will constitute the index number to be used in making the computation. The arrangement is such that the index number so selected by the spiral line corresponds exactly with the index number which is selected on the series of index number graduations 9.

In the present instance, I have utilized a single indicator arm for selecting the index number and for effecting the computation or count but it is not essential that these functions should be accomplished by the same member. The unit controlled means for automatically actuating the movable member of the computing device to determine the index number, and the load controlled means for automatically actuating said movable member to effect a computation or count may take various forms but, in the present mechanism, I have provided a unit balance for selecting the index number which is entirely separate from the load balance which actuates the indicator to effect the computation based upon that index number. As here shown, the unit balance comprises a main lever 12 which is carried by a pivot pin 13 mounted in suitable bearings on upright standards 14 carried by the base 1. Pivotally mounted on the outer end of this lever is a bail or carrier 15 in which is mounted a unit receptacle 16 adapted to receive a unit consisting of one or more articles corresponding in weight to the mass of articles which is to be counted. The lever 12 is connected between its fulcrum and the unit receptacle with a flexible ribbon 17 the upper end of which is secured to and extends about a cam 18. The connection between the lower end of the ribbon and the lever preferably comprises a stirrup 19 having in its cross bar a bearing to receive a needle point 20 carried by the lever. The cam 18 is rigidly mounted on a shaft 21 journaled in bearings 22 and 23. The bearing 22 is formed in a boss on the rear wall of the housing while the bearing 23 is formed in the cross bar 3. It is preferable that the cam should be adjustable with relation to the shaft and I have therefore mounted the same loosely on the shaft and have rigidly but adjustably secured it to the end of a hub like member 24 which is rigidly secured to the shaft. In the present instance, the cam is provided with a laterally projecting lug 25 which extends between the inner ends of two set screws 26 which are mounted in lugs 27 carried by the hub 24. A pendulum is provided to serve as a counterbalance for the weight of a unit placed in the unit receptacle. As here shown, a pendulum rod 28 is rigidly mounted in the hub member 24 and a weight 29 is rigidly but adjustably mounted on said rod by means of a set screw 30. Rigidly secured to the hub member 24 and, if desired, formed integral therewith is a projection 31 to which is rigidly secured the indicator 6. The unit balance lever 12 may also be provided with the usual dash pot 32 to check the vibrations thereof, as is customary in scale construction. That end of of the lever 12 opposite the unit receptacle is weighted, as shown at 33, to produce the proper tension on the ribbon 17 when the indicator 6 is at its zero position.

The load balance comprises a main lever 34 having a knife edge pivot 35 which rests in bearings in the upper end of standards 36 extending upwardly from the base 1.

A platform holder 37 is mounted on the main lever 34 which is here shown as provided with bearings to engage a knife edge pivot 38 rigidly secured to that lever. This holder is adapted to support a suitable platform or load receptacle to receive the mass of parts to be counted. The platform holder is retained in its proper horizontal position by means of a stem 39 extending downwardly therefrom and connected by a link 40 to a stem 41 projecting from the lower side of the base 1. The longer end of the main lever extends into the housing and is provided with a nose bar 42 having a needle point 43 to engage a bearing in a stirrup 44, which stirrup is connected with a flexible ribbon or strap 45 the upper end of which is secured to and extends about a cam 46. This cam is mounted upon a shaft 47 journaled in bearings 48 and 49 mounted respectively in the cross bars 3 and 4 and arranged in co-axial alinement with the shaft 21 of the unit actuated cam 18. The cam 46 is preferably adjustable with relation to the shaft and, as here shown, is adjustably but rigidly secured to a hub member 50 in the same manner that the cam 18 is secured to the hub member 24. A pendulum is provided to serve as a counterbalance for the weight of a load placed in the load receptacle, and, as here shown, a pendulum rod 51 is rigidly secured to the hub member 50 and a weight 52 is rigidly but adjustably secured to that rod by means of a set screw 53. The outer end of the lever 34 of the load balance is provided with a balance weight, as shown at 54, to maintain the proper tension on the ribbon 45 when there is no load on the platform of the scale. The load balance is also provided with a dash pot 55 to check the vibrations thereof. The cam 46 of the load balance is connected with the indicator 6 so that that indicator will be actuated by the load balance. The connection is of such a character that the indicator may be actuated by the unit balance independently of the load balance. To this end I have secured to the pendulum rod 51 an arm 56 which extends across the pendulum rod 28 of the unit balance and is provided with an adjustable screw 57 to engage the pendulum rod 28 and thus cause the hub 24 and the cam 18 to move with the hub 50 and cam 46 of the load balance, thereby actuating the indicator arm 6. Each of the cams has its center of gravity established at its axis, so that, as the cam is adjusted circumferentially when "sealing" the mechanism, the center of gravity of the corresponding pendulum will not be shifted by the varied position of the cam. To this end each cam is provided with an adjustable weight 58 by means of which its center of gravity may be established. The hub member 50 by the load actuated mechanism is provided with a projection or arm 59 which serves to limit the movement of the hub member by contact with a suitable stop, such as a resilient pad 60 secured to the cross bars 3 and 4. The stop 60 is also arranged in the paths of the pendulum balls 29 and 52 and thereby serve to limit the movement of the hub members 50 and 24 in the opposite direction.

In the operation of the scale to count the number of articles in a mass of like articles a unit consisting of one or more of said articles is placed in the unit receptacle 16, thereby causing the unit balance, through its cam 18 and independently of the load mechanism, to actuate the indicator 6 and cause that indicator to indicate on the series of index number graduations 9, and on the spiral line 11 when the latter is used, an index number. The index number having been noted the unit is removed from the unit receptacle and the mass of articles to be counted is placed on the load platform, thereby actuating the lever 34 and the cam 46 and through the connection between the cam 46 and the cam 18 actuating the indicator 6 and moving the same into a position corresponding to the weight of the load. The position of the selected index number on the indicator determines the reading line, or the particular series of unit number graduations to be used in effecting the computation, and the particular graduation, of that series of unit number graduations, which is intersected by the indicator represents the number of articles on the load platform. If it is desired to count out a specified number of articles the index number is selected in the same way and articles are poured onto the load platform until the indicator indicates the desired number on that series of unit number graduations corresponding to the selected index number. If the unit consists of a single article the number of the graduations intersected by the indicator represents the number of articles in the load or mass which is being counted. If the unit consists of a plurality of articles then it is necessary to multiply the number of the intersected graduation by the number of articles in the unit to determine the number of articles on the load platform. For example, if the unit contained ten articles and the indicator intersected the graduation numbered 390 in the proper series of unit number graduations, this number 390 would be multiplied by 10, thus indicating that there were 3900 articles on the load platform. While the unit may consist of any number of pieces it is preferable, for the sake of simplicity, to use either 1, 10 or 100 pieces as a unit, thus enabling the multiplication to be very quickly and accurately made.

It will be noted that the unit number graduations are all on the chart, the indicator carrying only the index numbers to establish the reading line on the chart. The index number graduations and the unit number graduations on the chart and the index numbers on the indicator are arranged arbitrarily but in certain definite relation one to the other so as to accurately effect the computation. Because of the arrangement of the unit numbers and the manner of selecting the index number I am enabled to compute the exact number of articles in any load within the capacity of the scale and to utilize for this purpose a unit consisting of any weight or any number of parts. It will also be noted that the indicator 6 moves over the series of weight graduations at the top of the chart, thereby indicating simultaneously the number of articles in the load and weight of the load in pounds and ounces. If the unit placed in the unit receptacle moves the indicator to a position where it does not register exactly with any index number graduation but lies between two such graduations the operator will use the index number nearest to the indicator. If the indicator lies exactly midway between the index number he may use either index number. This will cause a slight plus or minus error in the count but it will be so small as to be practically negligible.

While I have shown and described one embodiment of my invention it will be understood that I do not desire to be limited to the details thereof as various modifications may appear to a person skilled in the art. For example, it will be obvious that the unit actuated lever and the load actuated lever, which are here shown respectively as levers of the second and third principles, may be of any suitable principle and may be arranged in any suitable manner, and that the action of the counterbalancing device for these levers may be either that of a rising pendulum, which opposes the load, or that of a reversed pendulum, which descends as the load is applied to the lever; these being in both instances primarily matters of design.

Having now fully described my invention, what I claim as new and desire to secure by Letters Patent, is:

1. In a counting scale, a chart having a series of graduations representing index numbers and also having a plurality of series of graduations representing numbers of units, an indicator having a series of index numbers corresponding to the first mentioned series of graduations on said chart and arranged adjacent to the second mentioned series of graduations on said chart, one of said members being movable relatively to the other, means for actuating said movable member to select an index number corresponding to the weight of the unit, and other means for actuating said movable member to cause said indicator to indicate on that series of graduations corresponding to said index number the graduation which represents the number of units in the load.

2. In a counting scale, a chart having a series of graduations representing index numbers and also having a plurality of series of graduations representing numbers of units, an indicator having a series of index numbers corresponding to the first mentioned series of graduations on said chart and arranged adjacent to the respective last mentioned series of graduations on said chart, one of said members being movable relatively to the other, means for automatically actuating said movable member to select an index number corresponding to the weight of the unit, and other means for automatically actuating said movable member to cause said indicator to indicate on that series of graduations corresponding to said index number the graduation which represents the number of units in the load.

3. In a counting scale, a chart having a series of graduations representing index numbers and also having a plurality of series of graduations representing numbers of units, an indicator having a series of index numbers corresponding to the first mentioned series of graduations on said chart and arranged adjacent to the respective last mentioned series of graduations on said chart, one of said members being movable relatively to the other, unit controlled means for actuating said movable member to select an index member, and load controlled means for actuating said movable member to cause said indicator to indicate in that series of graduations corresponding to said index number a graduation which represents the number of units in the load.

4. In a counting scale, a chart having a series of graduations representing index numbers and also having a plurality of series of graduations representing numbers of units, an indicator having a series of index numbers corresponding to the first mentioned series of graduations on said chart and arranged adjacent to the respective last mentioned series of graduations on said chart, one of said members being movable relatively to the other, a unit receptacle mounted for movement and operatively connected with said movable member to select an index number, and a load receptacle mounted for movement and operatively connected with said movable member to cause said indicator to indicate in that series of graduations corresponding to said index number the graduation representing the number of units in the load.

5. In a counting scale, a chart having a series of graduations representing index numbers and also having a plurality of series of graduations representing numbers of units, an indicator having a series of index numbers corresponding to the first mentioned series of graduations on said chart and arranged adjacent to the respective last mentioned series of graduations on said chart, unit controlled means for adjusting said indicator with relation to said series of graduations to select an index number, and load controlled means for adjusting said indicator with relation to the last mentioned series of graduations and causing the same to indicate in that series of graduations corresponding to the selected index number a graduation which represents the number of units in the load.

6. In a counting scale, a chart having a series of graduations representing index numbers and also having a plurality of series of graduations representing numbers of units, an indicator having a series of index numbers corresponding to the first mentioned series of graduations on said chart and arranged adjacent to the respective last mentioned series of graduations on said chart, a unit controlled weight actuated member operatively connected with said indicator to move the same along said first mentioned series of graduations to select an index number, and a load controlled weight actuated member operatively connected with said indicator to move the same over the last mentioned series of graduations and to cause the same to indicate in that series of graduations corresponding to the selected index number a graduation representing the number of units in the load.

7. In a counting scale, a chart having a plurality of series of graduations representing numbers of units, an indicator having a series of index members arranged adjacent to the respective series of graduations on said chart, a unit controlled weight actuated member for adjusting said indicator, said chart having a marking cooperating with said indicator to select an index number, and load controlled weight actuated member operatively connected with said indicator to cause the same to indicate in that series of graduations corresponding to the selected index number a graduation which represents the number of units in the load.

8. In a counting scale, a chart having a plurality of series of graduations representing numbers of units, an indicator having a series of index numbers thereon and arranged adjacent to the respective series of graduations on said chart, one of said members being movable relatively to the other, unit controlled means to actuate said movable member, said members having parts which cooperate to select an index number, and load controlled means for actuating said movable member to cause said indicator to indicate in that series of graduations corresponding to the selected index number a graduation which represents the number of units in the load.

9. In a counting scale, a chart having a plurality of series of graduations representing numbers of units and also having a line intersecting the several series of graduations, an indicator having a series of index numbers, means for adjusting one of said members to cause said indicator to intersect said line on said chart to select an index number, and weight controlled means to adjust one of said members to cause said indicator to intersect that series of graduations on said chart corresponding to the selected index number at the graduation which represents the number of units in the load.

10. In a counting scale, a chart having a plurality of series of graduations representing numbers of units and also having a line intersecting the several series of graduations, an indicator having a series of index numbers arranged adjacent to the respective series of graduations on said chart, unit controlled means for actuating said indicator to cause it to intersect said line on said chart to determine the index number, and load controlled means for moving said indicator to cause the same to intersect that series of graduations on said chart corresponding to the selected index number at the graduation representing the number of units in the load.

11. In a counting scale, a chart having a plurality of series of graduations representing numbers of units and also having a line intersecting the several series of graduations, an indicator having a series of index numbers, means for adjusting one of said members to cause said indicator to intersect said line on said chart to select an index number, weight controlled means for adjusting one of said members to cause said indicator to intersect that series of graduations on said chart corresponding to the selected index number at the graduation which represents the number of units in the load, and means for indicating the weight of the load simultaneously with the last mentioned indication.

12. In a counting scale, a chart having a plurality of series of graduations representing numbers of units, an indicator having a series of index numbers thereon and arranged adjacent to the respective series of graduations on said chart, one of said members being movable relatively to the other unit controlled means for adjusting said movable member, said members having parts which cooperate to select an index number, load controlled means for adjusting said movable member to cause said indicator to indicate in that series of graduations corresponding to the selected index number a graduation which represents the number of units in the load, and means for indicating the weight of the load simultaneously with the last mentioned indication.

13. In a counting scale, a chart having a series of weight graduations and having a plurality of series of other graduations representing numbers of units, an indicator having a series of index numbers arranged adjacent to the respective last mentioned series of graduations on said chart, said chart having means cooperating with said indicator to select an index number and said indicator having a part arranged to travel adjacent to said weight indications, unit controlled means for actuating said indicator to select the index number, and load controlled means to actuate said indicator to cause it to indicate in that series of graduations on said chart corresponding to the selected index number the indication which represents the number of units in the load and to indicate on said series of weight indications the weight of said load.

14. In a counting scale, a chart having a plurality of series of graduations representing numbers of units, an indicator having a series of index numbers arranged adjacent to the respective series of graduations on said chart, said chart also having a marking cooperating with said indicator to select an index number, one of said members being movable relatively to the other, a unit receptacle mounted for movement and operatively connected with said movable member, and a load receptacle mounted for movement, separate from said unit receptacle and connected with said movable member.

15. In a counting scale, a chart having a plurality of series of graduations representing numbers of units, a pivoted indicator having a series of index numbers arranged adjacent to the respective series of graduations on said chart, said chart having a marking cooperating with said indicator to select an index number, a cam connected with said indicator at the axis thereof, a unit receptacle mounted for movement and connected with said cam, a second cam mounted on an axis coincident with the axis of the first mentioned cam, a load receptacle mounted for movement and operatively connected with said second cam, and means actuated by said load receptacle for connecting said cams one to the other for movement in unison, said connecting means being such that the first mentioned cam may be actuated by said unit receptacle independently of the second cam.

16. In a counting scale, a chart having a plurality of series of graduations representing numbers of units, a shaft, a hub mounted on said shaft, an indicator secured to said hub and having a series of index numbers arranged adjacent to the respective series of graduations on said chart, said chart also having a marking to cooperate with said indicator to select an index number, a cam secured to said hub, a unit receptacle mounted for movement and connected with said cam, a pendulum connected with said hub, a second shaft arranged on an axis coincident with the axis of the first mentioned shaft, a hub secured to said shaft, a pendulum carried by said hub, a cam secured to said hub, a load receptacle mounted for movement and connected with said cam, and a part carried by the last mentioned pendulum to engage the first mentioned pendulum and cause said indicator to be actuated by the movement of said load receptacle.

17. In a counting scale, a chart having a plurality of series of graduations representing numbers of units, a shaft, a hub mounted on said shaft, a cam adjustably secured to said hub, an indicator secured to said hub and having a series of index numbers arranged adjacent to the respective series of graduations on said chart, said chart also having a marking to cooperate with said indicator to select an index number, a pendulum carried by said hub, means for establishing the center of gravity of said cam at the axis thereof, a unit receptacle mounted for movement and connected with said cam, a second shaft arranged in axial alinement with the first mentioned shaft, a hub secured to said second shaft, a cam adjustably secured to said hub, a pendulum secured to said second hub, means for establishing the center of gravity of the last mentioned cam at the axis thereof, a load receptacle mounted for movement and connected with said second cam, and means for connecting said hubs one to the other to cause said indicator to be actuated by said load receptacle, said connecting means being such that the first mentioned hub may be operated by said unit receptacle independently of the second hub.

18. In a counting scale, intersecting indicating members comprising a chart and an indicator, said members having indicia thereon designed to register an index number, said chart having other indicia thereon representing numbers of units, means to cause said members to intersect to select an index number in accordance with the weight of a unit, and means to cause said members to intersect to compute the number of units in a mass in accordance with the weight of the mass and the significance of the selected index number.

19. In a counting scale, intersecting indicating members comprising a chart and an indicator, said members having indicia thereon designed to register an index number, said chart having other indicia representing numbers of units, unit controlled means to govern the intersection of said members to select an index number, and load controlled means to govern the intersection of said members to compute the number of units comprising a load in accordance with the significance of the selected index number.

20. In a counting scale, an indicating member having a plurality of series of graduations representing numbers of units, the significance of the graduations in each series being in accordance with a distinctive unit weight, and means for selecting one of said series of graduations according to the weight of a unit, and for indicating in the series thus selected the number of such units comprising a mass according to the weight of the mass.

In testimony whereof, I affix my signature hereto.

WILLIAM R. MITTENDORF.